US007033509B2

(12) United States Patent
Klein et al.

(10) Patent No.: US 7,033,509 B2
(45) Date of Patent: Apr. 25, 2006

(54) METHODS AND PROCESSES FOR IODINE DISINFECTION

(75) Inventors: Peter Morris Gilbert Klein, Dover Heights (AU); John Woodhouse, Park Orchards (AU)

(73) Assignee: Iodine Technologies Australiapty Ltd, Surrey Hills (AU)

( * ) Notice: Subject to any disclaimer, the term of this patent is extended or adjusted under 35 U.S.C. 154(b) by 117 days.

(21) Appl. No.: 10/333,465

(22) PCT Filed: Jul. 20, 2001

(86) PCT No.: PCT/AU01/00884

§ 371 (c)(1),
(2), (4) Date: Apr. 28, 2003

(87) PCT Pub. No.: WO02/08126

PCT Pub. Date: Jan. 31, 2002

(65) Prior Publication Data

US 2003/0183583 A1    Oct. 2, 2003

(30) Foreign Application Priority Data

Jul. 21, 2000    (AU) .................................... PQ8916

(51) Int. Cl.
*C02F 1/76*    (2006.01)
(52) U.S. Cl. ......................... 210/753; 210/764; 422/37

(58) Field of Classification Search ................ 210/753, 210/764, 765; 422/28, 37
See application file for complete search history.

(56) References Cited

U.S. PATENT DOCUMENTS

| 4,061,570 | A | * | 12/1977 | Fletcher et al. ............ 210/96.1 |
| 4,888,118 | A |  | 12/1989 | Barnes et al. |
| 5,219,580 | A | * | 6/1993 | Torres et al. ................ 424/667 |
| 5,324,438 | A | * | 6/1994 | McPhee et al. ............. 210/748 |
| 5,366,636 | A |  | 11/1994 | Marchin et al. |
| 6,051,140 | A |  | 4/2000 | Perry |
| 6,071,415 | A |  | 6/2000 | Frommer et al. |
| 6,139,731 | A | * | 10/2000 | Harvey et al. ............... 210/175 |
| 6,398,961 | B1 | * | 6/2002 | Wei et al. .................... 210/634 |
| 6,745,903 | B1 | * | 6/2004 | Grandics .................... 210/501 |
| 6,863,905 | B1 | * | 3/2005 | Shanbrom ................... 424/667 |

OTHER PUBLICATIONS

Derwent Abstract Accession No. 97-173225/16, Class D15, JP 09-037979-A (SENOO), Feb. 10, 1997.

* cited by examiner

*Primary Examiner*—Betsey Morrison Hoey
(74) *Attorney, Agent, or Firm*—Birch, Stewart, Kolasch & Birch, LLP

(57) ABSTRACT

An iodine purification process comprising; a source of fluid; means for delivery of iodine to the source of fluid for use in the purification process; the process further comprising means for recovery of the iodine and/or iodine and/or other iodine species derived from the iodine, from said fluid.

48 Claims, 4 Drawing Sheets

| 3 | Filter (Optional) | | 2 | Pump in recirculating system |
|---|---|---|---|---|
| 4 | Iodine Crystals Canister. | | 13 | Electrowinning conversion process; or |
| 5 | Treatment Station | | 14 | Catalyst conversion process; or |
| 7 | Iodine/Iodide Absorbing Resin | | 15 | Other conversion process |
| 8 | Iodine/Iodide Absorbing Resin | | 16 | Iodine collection tank |

| 3 | Filter (Optional) |
|---|---|
| 4 | Iodine Crystals Canister. |
| 5 | Treatment Station |
| 2 | Pump in recirculating system |

| 13 | Electrowinning conversion process; or |
|---|---|
| 14 | Catalyst conversion process; or |
| 15 | Other conversion process |
| 23 | Control Valves |

| 3 | Filter (Optional) | 14 | Catalyst conversion process; or |
|---|---|---|---|
| 4 | Iodine Crystals Canister. | 15 | Other conversion process |
| 5 | Treatment Station | 16 | Iodine collection tank |
| 7 | Iodine/Iodide Absorbing Resin | 23 | Control Valves |
| 8 | Iodine/Iodide Absorbing Resin | 19 | Iodine Release Resin |
| 2 | Pump in recirculating system | 20 | Iodine Release Resin |
| 13 | Electrowinning conversion process; or | → | Water Flow |

| 3 | Filter (Optional) | | 15 | Other conversion process |
|---|---|---|---|---|
| 4 | Iodine Crystals Canister. | | 23 | Control Valves |
| 5 | Treatment Station | | 19 | Iodine Release Resin |
| 2 | Pump in recirculating system | | 20 | Iodine Release Resin |
| 13 | Electrowinning conversion process; or | | → | Water Flow |
| 14 | Catalyst conversion process; or | | | |

METHODS AND PROCESSES FOR IODINE DISINFECTION

This application is the national phase under 35 U.S.C. § 371 of PCT International Application No. PCT/AU01/00884 which has an International filing date of Jul. 20, 2001, which designated the United States of America.

BACKGROUND

The present invention relates to treatment processes using iodine and more particularly relates to improved methods and processes for sanitization/disinfection of water reticulation networks such as but not limited to cooling towers, swimming pools, water tanks, waste water, sewerage and water washing of consumables such as but not limited to food products and drinking water wherein the concentration of active iodine in iodine enriched water used in the disinfecting processes can be maintained within a predetermined optimum range. More particularly the invention relates to processes and methods for disinfection using iodine enriched water wherein the water is constantly recharged with iodine and wherein iodide and iodine bi-products and other iodine species may be continuously removed from the processes and converted to iodine for either recharging said water or for retention and further re-use in the process.

PRIOR ART

Chlorine and Iodine are well known as agents for microbiological control in water supply systems. Iodine has a number of advantages over Chlorine.

Disadvantages of chlorine used as a microbiological agent include the following:
1. Formation of by products (trihalomethanes and chlorofuranones—THM's) that have been found to be mutagenic and carcenogenic and are subject to increasing worldwide government regulation.
2. As chlorine is a gas at room temperature it is extremely toxic.
3. Chlorine is corrosive potentially adding a significant cost to accelerated equipment replacement.
4. Chlorine has high sensitivity to changes in pH and temperature and is only effective in a narrow band of pH and to achieve this desired pH level requires constant monitoring and adjustment.
5. Continued use can significantly affect the quality of the wash water that is required to be disposed of at the end of a disinfection process leading to the growing need to treat this waste water prior to disposal.
6. Chlorine is required to be used in many sanitation operations involving food stuffs at high levels (up to 250 ppm) to achieve acceptable microbial kill rates.

While there is growing pressure to reduce bacterial loads on foodstuffs this must be balanced against the disadvantages of increased use of chlorine which is undesirable for the above reasons. In recognition of the advantages of use of iodine as a purification and disinfecting agent, a number of systems have been developed which employ molecular iodine in the sanitization of water for drinking purposes and for use in processes which include disinfection of sewage, foodstuffs and waste water.

Iodine is the preferred sanitizing agent in the food industry as it is acknowledged as a more effective user friendly sanitizing agent than chlorine. In addition, depending upon the concentrations, it is safe, can be effectively used at reduced concentrations (up to ten times less) than chlorine yet with a higher microbial kill rate. Iodine (unlike chlorine) does not produce any harmful substances such as carcinogens, and if nearly all by-products are removed, can produce an environmentally safe waste water. Being a solid at room temperatures and supplied, immersed in water, the potentially harmful effects of exposure to a concentrated sanitizing agent such as chlorine are removed, significantly improving environmental work conditions. Furthermore, iodine is less corrosive than chlorine reducing corrosive effects from the use of a biocide.

A number of United States patents disclose the use of iodine in conjunction with processes for purification of water. For example, U.S. Pat. No. 4,888,118 discloses a water purification process in which the water is passed through a mass of nylon 4 complex with iodine. The treated water is subsequently passed through nylon 4 to remove iodine from the water.

U.S. Pat. No. 5,176,836 discloses a new and improved water purification process or method by introduction of molecular iodine into the water supply to impart a desired iodine residual wherein the water is passed through an iodinated anion exchange bed wherein the concentration of $I_2$ in the flowing water gradually decreases and the ion bed is recharged by treatment with an aqueous iodine solution produced by flowing water through a bed of iodine crystals having connections in parallel with the ion exchange bed and activated periodically e.g. by a timer, by measured flow of water or by residual level to recharge the bed. That system provides for long term microbiological control in water suitable for potable activities. The bed of Iodine crystals is provided with connections for flowing water there through to produce a concentrated (substantially saturated) aqueous iodine solution which is passed through the iodinated resin bed to recharge the bed with bound iodine.

One of the difficulties with the known systems is to maintain an optimum amount of active iodine delivered into the target water supply for the specified purpose. To date there has been no effective system which can effectively and economically guarantee the delivery of exactly the right amount of active iodine at higher levels into the water used to wash produce in the case where iodine is used for food sanitization or into water delivered through reticulation networks, not only to prevent waste of iodine and economic loss but also to ensure that there is an acceptable minimum of active iodine.

Iodine recovery processes are known whose objective is to recover iodine to compensate for gradual reduction of $I_2$ in the flowing water and to provide a desired iodine residual. The process described in U.S. Pat. No. 5,176,836 is distinguished from previous systems by providing a continuous long term microbiological control process in a water supply particularly in space vehicle applications wherein $I_2$ is released into the water stream flowing through a suitable anion exchange resin.

U.S. Pat. No. 5,919,374 discloses a method and apparatus for producing bacteria free iodine species containing drinking water for farm animals under continuous dynamic water flow to produce a saturated iodine species containing aqueous solution at a pre selected temperature and blending the saturated solution with a second water flow to produce a diluted iodine species bacterium free aqueous solution.

U.S. Pat. Nos. 4,131,645; 5,356,611; 5,464,603; 5,639,452; 6,139,731; and 6,004,465 disclose prior art processes in which iodine is employed, each of which is incorporated herein by reference. The processes described in those US patents do not teach the use of means to effectively and economically control delivery of iodine in a water stream, nor do they disclose collection and conversion of iodide to iodine species for re use in the process.

Iodinated resin beds are known as a means for recharging a water supply with a minimum amount of active iodine. The recharging is effected by treatment with an aqueous iodine solution produced by flowing water through a bed of iodine crystals. The iodine residual is monitored and the bed recharged where necessary by adjusting the flow rate of water through the bed of iodine crystals. This is an expensive method of monitoring the level of active iodine and the resin rich in bound iodine is very expensive. In addition, the capacity of the resin is limited and reloading techniques in the field would be difficult to maintain in high water flow conditions. Also, this process is best suited to low level (<4 ppm) delivery of active iodine usually in a clean filtered water environment. This is due to the slow dissolving rate of iodine from known iodine beds and the limitation of the release rate and saturation of the anion exchange resins.

An ideal level of active iodine to be maintained in a water supply process system for food sanitization purposes is in the range of 10 ppm to 25 ppm although some applications may require higher concentrations. When iodine is used in food sanitizing applications, it may react with organic matter in which case the active iodine can be quickly exhausted to the point where there is none left for microbiological control. Also, iodide can build up in iodine wash water solutions causing a further conversion of active iodine into iodide species thereby causing a further diminution of the bacteriocidal effect of the process.

If resins are used to deliver active iodine, this will necessitate continual monitoring of iodine concentration and it will also require recharging the target water stream with active iodine. It is expensive to replace resin so it is ideal that the resin life be prolonged for as long as possible. Saturation of resin with 46% weight Iodine will produce around 4 ppm active iodine release. However, the operating range of these resins is limited and they all exhibit a severe depletion curve becoming ineffective at approximately 40% saturation. In other words, there is only a narrow band of approximately 6% by way of volume within which the resins will operate before requiring recharging.

Known iodine resins such as those available from the corporations Dow Chemicals, Purolite, Rohm & Haas etc can deliver up to 4 ppm of active iodine but the ideal level to be maintained for food operations is 10 ppm to 25 ppm. The known iodine purification processes are limited in their applications because they;

do not teach a practical method of continuously delivering concentrations of active iodine up to 25 ppm within a high volume flow rate environment;
do not teach how to provide for the constant removal of iodide and iodide specie bi-products from the wash water;
do not teach how to stop the exhaustion of active iodine by interaction with the iodide specie present in the wash water;
do not teach a process that can use iodine as a sanitation biocide for use in environments that have high organic and bacteria loads;
do not teach a process to collect iodide bi-products and convert the iodide back into iodine;

and to date have primarily been applied to water supply systems for drinking water. The known processes do not teach an economic method or arrangement for maintaining the iodine level at a predetermined optimum level. Furthermore, the prior art does not teach the application of controlled iodine purification processes to water reticulation networks and in such applications as fruit and vegetable washing, fresh cut food operations, food processing plants, swimming pools, cooling towers, town water supplies, tanks and the like. A controlled iodine delivery process would be one in which the level of iodine can be maintained at a predetermined optimum level and without constant manual intervention and monitoring. The prior art does not teach such a process alone or in combination with a recovery process in which surplus iodine and iodide can be recovered from the process for respective re use and conversion to iodine for reuse.

Elemental iodine is a biocidally active form of iodine that has been used as a water disinfectant for almost a century. It is also widely used as a sanitizing compound in the food processing industry. Chlorine solution (especially hypochlorites) have been widely using by growers as a sanitising wash for many fruits and vegetables. However, the strong oxidizing effect of chlorine in water with a moderate to high organic load results in a number of different complex compounds (trihalomethanes or THM) which can become a significant environmental hazard. There are strong reasons to minimise the excessive use of chlorine on foods, particularly due to THM levels. Chlorine dips can also cause soil pollution with continuous re use on farms.

Besides the environmental and health benefits of using the iodine for washing fresh produce, it is also reported that iodine is more active against a number of organisms in water, than chlorine (Koponen et al. 1993). The efficiency of iodine for the control of *Escherichia coli* in dirty water was found to be greater than that of chlorine especially at the higher temperature and pH values (Ellis et al., 1993). Effectiveness of iodine on pathogenic organisms at low concentration (Oliver et al., 1991) has been reported to be cost effective and less hazardous for the users (Oliver et al., 1991).

DETAILED DESCRIPTION OF THE INVENTION

The present invention seeks to provide an improved process, method and apparatus for maintaining the level of active iodine in a process for sanitizing such consumables as foods stuffs or in a water reticulation network and more particularly provides a purification process which includes extraction of iodide and surplus iodine from the process and subsequent conversion of iodide to iodine for reuse within the process.

It is one object of the invention to provide a process and method for sanitization of water used in food sanitization and in reticulation networks that reduces labor and which requires no pre mixing of chemicals or pH adjustment to maintain optimum levels of iodine and biocidal action.

It is a further object to provide a process, apparatus and method that provides a more accurate method of delivery of a strong biocide such as iodine into a target wash water stream, wherein the process ensures such wash water remains rich in active iodine and the process remains pure without the build up of iodide by-products which in turn deplete iodine in a wash tank.

It is a further object of the process and method to deliver a controlled amount of iodine biocide accurately and constantly and at the same time removing the same amount of iodine species present in a wash water. The process then ensures an accurate level of biocide is maintained at all times. It is a further object of the present invention to maintain a constant pre determined active biocide level in a water stream used in a variety of applications.

It is a further object to provide an environmentally friendly system for providing an efficacious method of controlling bacteria at the same time as removing bi-products of the biocide used.

It is a further object of the process to provide means for accurate control and measurement of a biocide in solution and further means to enable recordal of that information for confirmation of accuracy of the process.

It is a further object of the invention to provide the option for control mechanisms to accurately measure the available biocide in solution and for that information to be used to vary the level of dosage and delivery of biocide into the process.

In one broad form the present invention comprises;
an iodine purification process comprising;
a source of fluid;
means for delivery of iodine to said source of fluid for use in said purification process;
the process further comprising means for recovery of said iodine and/or iodide and/or other iodine species derived from said iodine from said fluid.

Preferably, the process further comprises means for conversion of iodine species derived from the iodine delivered to said solution to iodine($I_2$) wherein the iodine/iodide or the other derivative iodine species are recovered on an anion exchange resin.

The iodine/iodide or the other derivative iodine species may be converted via conventional chemical means for recovery of iodine. The conversion may be performed either as part of the process or off site remote from said process. According to one embodiment, the conversion may be effected by an electrowinning process. Alternatively, the conversion may be performed remote from said process using green sand as a catalyst. The iodine/iodide or said other derivative iodine species may be separated from the anion exchange resin by washing the resin with a solution of potassium hydroxide.

According to one embodiment, the water is charged with a predetermined concentration of iodine; wherein the process includes; a continuous water supply to or for one or more applications; a source of iodine intermediate the source of the main water supply and a treatment station fed by the main water supply; wherein delivery of the iodine is maintained at a predetermined concentration within a predetermined range in a water stream delivered from the water supply. The predetermined concentration of iodine provides a predetermined level of purification of the water stream.

Preferably, the concentration of iodine delivered to the water stream is maintained by use of an iodine formulation having a high surface area which is capable of fast dissolving in a water flow stream. The iodine concentration is maintained in the flow stream irrespective of the flow rate, temperature of the water stream and level of contamination of said water. Preferably, the predetermined concentration of iodine is proportionate to a level of contamination of said water stream.

In another embodiment, the process includes an anion exchange resin capable of absorbing iodide and iodine species. The resin collects the iodine species for reuse in said process and is removable from the collection station. The water purification process may be applied in food treatment, water reticulation installations including swimming pools, cooling towers, water supplies, water tanks and town water.

In another broad form, the present invention comprises; a conversion process for conversion of iodine species to iodine ($I_2$) wherein the iodine species for conversion by the conversion process is derived from an iodine purification process, the process comprising;
a source of fluid;
means for delivery of iodine to said source of fluid for use in said purification process;
the iodine purification process further comprising means for recovery of said iodine and/or iodide and/or other iodine species derived from said iodine from said fluid prior to conversion to $I_2$ by said conversion process.

Preferably the iodine/iodide or other derivative iodine species are recovered prior to the conversion process on an anion exchange absorption resin. The conversion may be performed either as part of the purification process or remote from the process by an electrowinning process, a catalyst or other conversion process.

Alternatively, the conversion process is performed using green sand as a catalyst.

In another broad form the present invention comprises a process for the continuous iodine assisted purification of water during use in applications including the washing of consumables such as foodstuffs and in water reticulation installations; wherein, said water is charged with a predetermined concentration of iodine; wherein the process includes; a continuous water supply to or for one or more said applications;

a source of iodine intermediate said source of said main water supply and a treatment station fed by said main water supply; wherein said source of iodine is maintained at a predetermined concentration of elemental iodine within a predetermined range in a water stream delivered from said water supply;

wherein said predetermined concentration of iodine provides a predetermined level of purification of said water stream.

According to a preferred embodiment, the concentration of iodine is maintained by use of an electrodeposited particulate iodine formulation having a high surface area which is capable of fast dissolving in a water flow stream.

The iodine concentration is maintained in the flow stream irrespective of the flow rate of the water stream and level of contamination of said water; wherein said concentration of elemental iodine in said water stream is maintained by controlled release of iodine from said source.

In another embodiment an anion exchange release resin is charged with a predetermined amount of elemental iodine wherein the anion exchange release resin is located between the source of iodine and the treatment station. The anion exchange release resin is housed in one or more sealed containers.

The process further comprises a collecting station for collecting iodide and/or iodine or iodine species from water delivered downstream of said treatment station. In one embodiment, the means for collecting iodide and/or iodine species comprises an in line anion exchange collection resin. The resin collects the iodide for conversion to iodine for reuse in the process wherein the iodide and/or iodine species collection resin is removable from the collection station. The iodide is stripped from the resin at a location remote from the process. One means for conversion of said iodide and/or iodine species comprises an electrochemical process conducted remote from the sanitizing process.

After collection of surplus iodine and/or iodide or other iodine species from water delivered from the treatment station, the water is either recirculated through the process or dumped to waste.

Water recirculated through the process may be recharged with iodine by passing through iodine crystals prior to entry into the treatment station which may comprise a reservoir.

Another means for converting iodide and/or iodine species is an in line catalyst. Alternative conversion means comprise an in line or off site electrochemical process or chemical reactions. Preferably, the chemical reactions employ the use of known oxidants which may be selected from permanganate, dichromate, hydrogen peroxide, bromate, iodate, chlorate, cerium, copper, chlorine and bromine.

In another broad form of a method aspect, the present invention comprises;

a method of iodine purification in a fluid stream charged with a source of fluid; the method including the steps of;
a) providing means for controlled delivery of iodine to said source of fluid for use in said purification process and delivering iodine to said fluid;
b) recovering said iodine and/or iodide and/or other iodine species derived from said iodine from said fluid after said purification.

The method comprises the further step of converting of iodine species derived from the iodine delivered to the solution to iodine ($I_2$) and the further step of prior to conversion, collecting the iodine/iodide or said other derivative iodine species on an anion exchange resin. The conversion may be performed remote from said process. Alternatively, a collection and conversion may be in line as part of the purification process. The conversion step is according to one embodiment performed by an electrowinning process.

According to another embodiment of the method aspect, the conversion step is performed remote from the process using green sand as a catalyst.

The method preferably comprises the further step of separating the iodine/iodide or said other derivative iodine species from the anion exchange resin wherein the separation step may comprise washing the resin with a solution of potassium hydroxide.

According to the method aspect, the supply water is charged with a predetermined concentration of iodine; wherein the process includes; a continuous water supply to or for one or more applications;

a source of iodine intermediate said source of said main water supply and a treatment station fed by said main water supply; wherein said source of iodine is maintained at a predetermined concentration of elemental iodine within a predetermined range in a water stream delivered from said water supply;

wherein the predetermined concentration of iodine provides a predetermined level of purification of the water stream.

Preferably, the concentration of iodine delivered to the water stream is maintained by use of an iodine formulation which has a high surface area and is capable of fast dissolving in a water flow stream wherein the iodine concentration is maintained in the flow stream irrespective of the flow rate, temperature of the water stream and level of contamination of said water.

Preferably, the predetermined concentration of iodine is proportionate to the level of contamination of said water stream. The method may comprise the further step of charging an anion exchange release resin with a predetermined amount of elemental iodine. The method steps of the water purification process may be applied in food sanitization, water reticulation installations including swimming pools, cooling towers, water supplies, water tanks and town water.

According to one embodiment there is provided a purification process for use in the purification of food products and of water in installations such as swimming pools, cooling towers, domestic water reticulation networks, portable water supplies, water tanks and the like.

In a typical arrangement according to one embodiment of the invention, there is provided a specially prepared iodine (BioMaxA™) located in a sealed cartridge or canister enclosed in a sealed canister. This BioMaxA™ iodine has a high surface area relative to existing forms of commercially available iodine and is specially formulated to quickly dissolve in water providing a constant saturated solution of iodine. The level of saturation is affected by temperature. The sealed canister is attached to a water flow line for delivery of a predetermined concentration of saturated iodine solution in order to achieve a required final concentration of iodine for the selected sanitation application. Preferably, a control valve is used to ensure that a target concentration of saturated iodine solution is released into the main water flow. The control valve is responsive to or is preset to temperature variations and final iodine concentration required. An amalgamation of both water streams being the main water flow and the saturated solution charged with iodine ensures a final diluted concentration of iodine is achieved in line with process requirements.

The process may be computer controlled to maintain predetermined optimum operating levels. Known methods of computer control of fluid flow parameters can be used to monitor iodine and iodide levels. These may include the use of probes and/or sensors located to detect predetermined parameter levels. Where there is no or minimal bacteria in the installation or food stuff under treatment, iodine may not be used up. Thus, iodine demand will be a function of microbiological load and reactions with organic matter. As iodine can be quickly exhausted when it reacts with organic matter, (albeit to a lesser extent than chlorine), there is a need to continually monitor available iodine for microbiological control.

According to one embodiment, the process includes the use of a conversion process to process the iodide species captured by the anion exchange resins and convert these iodide species back to a preferred BioMaxA™ iodine. Although there are known means for this conversion they are expensive and inefficient and have not been applied in a continuous iodine sanitization process. The present invention seeks to provide a process for the purification of water used in sanitizing food stuffs and in installations which employ water reticulations wherein the process includes a step of conversion of iodide to iodine in an efficient and economic manner.

According to one embodiment, the process includes the collection of iodine and iodide surplus to the process on a series of two or more anion exchange resin columns. Once collected, these resin columns are taken offsite for processing. This involves firstly stripping of the iodide from the resin columns. There are a number of different ways that this could be achieved—for example by the use of a solution of potassium hydroxide. According to one embodiment, once stripped, this solution is mixed with sulphuric acid and results in the production of potassium sulfide, hydrogen gas and a concentrated iodide solution. This iodide solution is then passed on to the next stage of the conversion process for production of iodine.

According to one embodiment, the conversion process involves the use of an electrochemical electro-winning process (such as that described in the applicant's co pending Australia patent application No PQ8915) which is capable of conversion of iodide to iodine to supplement existing iodine used in the system. This electro-winning process generates a particular form of high surface area fast dissolving iodine crystals which precipitates from the solution and is then available for reuse in the process.

In one broad form the present invention comprises:

A process for sanitizing water used in the washing of consumables such as foodstuffs and in installations using water reticulation such as swimming pools, water supplies, cooling towers, water tanks, town water by washing or flushing with iodine enriched water: means for maintaining a concentration of elemental iodine within a predetermined range in a water stream used in said sanitizing process;

the process comprising: a closed or open water reticulation network including;

a source of main water supply for delivery to a treatment station:

a source of iodine disposed intermediate said source of main water supply and said treatment station:

wherein effluent from said treatment station flows through at least two receptacles for holding an anion exchange collection resin capable of collecting said iodine and iodide created by the process which is retrieved for further use in the process.

Preferably, the anion exchange resin receptacles holding iodide collected from water exiting said treatment station are taken off site for stripping of iodide and conversion to iodine using a conversion process to regenerate iodine for further reuse in the process.

According to one embodiment, said at least two receptacles discharge effluent for reuse in the process or for discharge from the process.

According to an alternative embodiment, the process further comprises at least one receptacle for holding an anion exchange release resin charged with a predetermined amount of elemental iodine and disposed intermediate said source of iodine and said treatment station In another embodiment the process includes a conversion station for conversion of iodide and/or iodine species. According to this embodiment, the conversion station is in line and is disposed immediately prior to the iodine crystal canister/s but without an anion collecting resin cartridge; wherein the water stream is recirculated.

In its broadest form the present invention comprises;

A purification process using iodine for decontamination, the process comprising;

a source of water for one or more water consuming applications and providing a water stream in said process;

a delivery station intermediate said source of water and a treatment station;

a source of iodine at the delivery station and means to enable release into said water stream of said iodine; wherein the iodine in said water stream is maintained at a predetermined concentration to provide a predetermined level of purification of said water stream and/or objects in contact with said water stream in the treatment station;

means for recovery from said water stream of said iodine and/or iodide and/or other iodine species derived from said iodine; and means for conversion of all said recovered iodine species derived from said iodine delivered to said stream to iodine as used in this system.

In its broadest form of the method aspect the present invention comprises:

a method of iodine purification of a water stream and/or objects therein; the method including the steps of;

a) providing a source of water for one or more water consuming applications and providing a water stream as part of a the purification process;
b) providing an iodine delivery station intermediate said source of water and a treatment station;
c) providing a source of iodine at the delivery station and means to enable controlled release into said water stream of said iodine;
d) charging water with a predetermined concentration of the high surface area iodine
e) recovering said iodine and/or iodide and/or other iodine species derived from said iodine from said fluid after said purification;
f) converting the iodine and/or iodide and/or other iodide species to iodine (I2)for reuse in the purification process.

In another broad form according to the method aspect, the present invention comprises; a method for sanitizing water used in the washing of consumables such as foodstuffs and in installations using water reticulation such as swimming pools, water supplies, cooling towers, water tanks, town water by flushing or washing with iodine enriched water wherein a concentration of elemental iodine is maintained within a predetermined range in a water stream; the method comprising the steps of:

a) placing a source of iodine intermediate a source of main water supply and a treatment station fed by said main water supply:
b) placing at least one receptacle for containing an anion exchange release resin charged with a predetermined amount of elemental iodine between said source of elemental iodine and said treatment station;
c) providing a conversion station capable of converting iodide to iodine at ambient temperatures using air as an oxidant and placing the station in communication with water exiting said treatment station;
d) and/or passing water through said source of iodine for enriching said main water supply with iodine, prior to introducing water from said main water supply into said at least one release resin receptacles; and/or
e) passing water through said at least one receptacle containing said anion exchange release resin:
f) allowing said at least one release resin receptacle to release water having a predetermined concentration of elemental iodine into water from said water supply;
h) using water having said predetermined concentration of iodine water in the decontamination of consumables such as foodstuffs or in installations using water reticulation such as swimming pools, water supplies, cooling towers, water tanks, town water;
i) converting iodide and iodine species to iodine at said conversion station.

According to a preferred embodiment the method comprises the further steps of
j) recirculating water from said treatment station
k) repeating steps (d)–(i).

Preferably said conversion step is effected at said conversion station using an electrowinning process, a catalyst or chemical process.

In another broad form according to the method aspect, the present invention comprises; a method for sanitizing water used in the washing of consumables such as foodstuffs and in installations using water reticulation such as swimming pools, water supplies, cooling towers, water tanks, town water by flushing or washing with iodine enriched water;

wherein a concentration of elemental iodine is maintained within a predetermined range in a water stream; the method comprising the steps of:
a) placing a source of iodine intermediate a source of main water supply and a treatment station fed by said main water supply:
b) placing at least one receptacle for containing an anion exchange release resin charged with a predetermined amount of elemental iodine between said source of elemental iodine and said station;
c) placing at least one further receptacle for holding an anion exchange collection/ absorbing resin capable of collecting the iodide created by the sanitization;
d) passing water through said source of iodine for enriching said main water supply prior to introducing water from said main water supply into said at least one release resin receptacles:
e) allowing said at least one release resin receptacle to release water having a predetermined concentration of elemental iodine into water from said water supply;
f) passing water through said treatment station and using water having said predetermined concentration of iodine water in the decontamination of consumables such as foodstuffs or
g) passing water with said predetermined concentration of iodine through installations using water reticulation such as swimming pools, water supplies, cooling towers, water tanks, town water.
h) passing water exiting said treatment station through said anion exchange collecting resin for collection of iodide and/or iodine species:
i) removing iodide and or iodide species from said resin;
j) converting said collected iodide or iodine species to iodine using an electrowinning process, a catalyst or chemical reactions.

According to a preferred embodiment the method comprises the further steps of;
k) recirculating water discharged from said collection resins through said process.
l) repeating steps (d)–(i)

According to a preferred embodiment, the method comprises the further steps; of stripping iodide from said resin and recharging said resin to its original condition and prior to stripping said iodide from said resin, washing all organic matter dirt and foreign chemicals and the like from the resin rich in iodide.

According to one embodiment, the method comprises the further steps; of stripping iodide from said resin and recharging said resin to its original condition and converting the iodide to iodine using an electrochemical electrolysis process capable of converting iodide to iodine; and prior to stripping said iodide from said resin, washing all organic matter dirt and foreign chemicals and the like from the resin rich in iodide.

In another broad form according to the method aspect, the present invention comprises; a method for sanitizing water used in the washing of consumables such as foodstuffs and in installations using water reticulation such as swimming pools, water supplies, cooling towers, water tanks, town water by flushing or washing with iodine enriched water: wherein a concentration of elemental iodine is maintained within a predetermined range in a water stream; the method comprising the steps of:
a) providing a source of iodine intermediate a source of main water supply and a treatment station fed by said main water supply:
b) providing at least one receptacle for holding an anion exchange collection resin capable of collecting iodide and or iodine species created by the process and remaining in water exiting the said treatment station;
c) passing water from said treatment station through said anion exchange collecting resins:
d) passing water through said source of iodine for enriching said main water supply prior to introducing water from said main water supply into said treatment station;
e) removing iodide and or iodide species from said resin;
f) converting said collected iodide and/or or iodine species to iodine using an electrowinning process, a catalyst or chemical reactions.

According to a preferred embodiment the method comprises the further steps of;
g) recirculating water from said treatment reservoir;
h) repeating steps (a)–(g).

In another broad form according to the method aspect, the present invention comprises; a method for sanitizing water having said predetermined concentration of iodine water in the decontamination of consumables such as foodstuffs and in installations using water reticulation such as swimming pools, water supplies, cooling towers, water tanks, town water by washing with iodine enriched water wherein a concentration of elemental iodine is maintained within a predetermined range in a water stream; the method comprising the steps of;
a) placing a source of iodine intermediate a source of main water supply and a treatment station fed by said main water supply:
b) passing water through said source of iodine for enriching said main water supply;
c) using water having said predetermined concentration of iodine water in the decontamination of consumables such as foodstuffs or in installations using water reticulation such as swimming pools, water supplies, cooling towers, water tanks, town water;
d) taking water from said treatment station and delivering it to a conversion station wherein iodide and/or iodine species in said water may be converted to iodine by an electrowinning process, a catalyst or a chemical process.
e) recirculating water from said conversion for reuse in sanitization.

In an alternative form the present invention comprises:
a process for maintaining a concentration of elemental iodine within a predetermined range in a water stream used in a process for sanitizing water in the decontamination of consumables such as foodstuffs and in installations using water reticulation such as swimming pools, water supplies, cooling towers, water tanks, town water by flushing or washing with water having said predetermined concentration of iodine;

wherein the process comprises: a water reticulation network including a source of main water supply for delivery to a treatment station: a source of iodine disposed intermediate said source of main water supply and said treatment reservoir; at least one receptacle for holding an anion exchange release resin charged with a predetermined amount of elemental iodine and disposed intermediate said source of iodine and said treatment station: wherein, effluent from said treatment station is in communication with an iodide/absorption collection resin which receives said effluent from said reservoir and prior to recirculation through said process; wherein said iodide collecting resin may be removed from the system and stripped of collected iodide whereupon a resultant iodide solution is passed through a conversion station capable of conversion of iodide to iodine thereby providing an iodine rich solution for reuse in said primary process.

According to a preferred embodiment the conversion of iodide to iodine is effected by an electrowinning process, catalyst such as green sand or a chemical process.

Preferably, when said collecting resin is removed from said process it is taken to a laboratory/factory in which the conversion will take place.

In an alternative form the present invention comprises:

a process for maintaining a concentration of elemental iodine within a predetermined range in a water stream used in a process for sanitizing water in the decontamination of consumables such as foodstuffs and in installations using water reticulation such as swimming pools, water supplies, cooling towers, water tanks, town water by flushing or washing with water having said predetermined concentration of iodine; wherein the process comprises: a water reticulation network including a source of main water supply for delivery to a treatment station: a source of iodine disposed intermediate said source of main water supply and said treatment reservoir; wherein, effluent from said treatment station is in communication with an iodide/absorption collection resin which receives said effluent from said reservoir and prior to recirculation through said process; wherein said iodide collecting resin may be removed from the system and stripped of collected iodide whereupon a resultant iodide solution is passed through a conversion station capable of conversion of iodide to iodine thereby providing an iodine rich solution for reuse in said primary process.

According to a preferred embodiment the conversion of iodide to iodine is effected by an electrowinning process, catalyst such as green sand or a chemical process.

In an alternative form the present invention comprises:

a process for maintaining a concentration of elemental iodine within a predetermined range in a water stream used in a process for sanitizing water in the decontamination of consumables such as foodstuffs and in installations using water reticulation such as swimming pools, water supplies, cooling towers, water tanks, town water by flushing or washing with water having said predetermined concentration of iodine; wherein the process comprises: a water reticulation network including a source of main water supply for delivery to a treatment station: a source of iodine disposed intermediate said source of main water supply and said treatment reservoir; wherein, effluent from said treatment station is in communication with an in line conversion station capable of conversion of iodide to iodine thereby providing an iodine rich solution for reuse in said sanitization process.

According to a preferred embodiment the conversion of iodide to iodine is effected by an electrowinning process, catalyst such as green sand or a chemical process.

In an alternative form the present invention comprises:

a process for maintaining a concentration of elemental iodine within a predetermined range in a water stream used in a process for sanitizing water in the decontamination of consumables such as foodstuffs and in installations using water reticulation such as swimming pools, water supplies, cooling towers, water tanks, town water by flushing or washing with water having said predetermined concentration of iodine; wherein the process comprises: a water reticulation network including a source of main water supply for delivery to a treatment station: a source of iodine disposed intermediate said source of main water supply and said treatment reservoir; at least one receptacle for holding an anion exchange release resin charged with a predetermined amount of elemental iodine and disposed intermediate said source of iodine and said treatment station: wherein, effluent from said treatment station is in communication with an in line conversion station capable of conversion of iodide to iodine thereby providing an iodine rich solution for reuse in said primary process.

According to a preferred embodiment the conversion of iodide to iodine is effected by an electrowinning process, catalyst such as green sand or a chemical process.

In an alternative form the present invention comprises:

a process for maintaining a concentration of elemental iodine within a predetermined range in a water stream used in a process for sanitizing water in the decontamination of consumables such as foodstuffs and in installations using water reticulation such as swimming pools, water supplies, cooling towers, water tanks, town water by flushing or washing with water having said predetermined concentration of iodine; wherein the process comprises: a water reticulation network including a source of main water supply for delivery to a treatment station; a source of iodine disposed intermediate said source of main water supply and said treatment reservoir; wherein, effluent from said treatment station is in communication with an in line conversion station capable of conversion of iodide to iodine thereby providing an iodine rich solution for reuse in said sanitizing process.

According to a preferred embodiment the conversion of iodide to iodine is effected by an electrowinning process, catalyst such as green sand, or a chemical process.

In an alternative form the present invention comprises:

a process for maintaining a concentration of elemental iodine within a predetermined range in a water stream used in a process for sanitizing water in the decontamination of consumables such as foodstuffs and in installations using water reticulation such as swimming pools, water supplies, cooling towers, water tanks, town water by flushing or washing with water having said predetermined concentration of iodine; wherein the process comprises: a water reticulation network including a source of main water supply for delivery to a treatment station; a source of iodine disposed intermediate said source of main water supply and said treatment reservoir; at least one receptacle for holding an anion exchange release resin charged with a predetermined amount of elemental iodine and disposed intermediate said source of iodine and said treatment station; wherein, effluent from said treatment station is in communication with an in line conversion station capable of conversion of iodide to iodine thereby providing an iodine rich solution for reuse in said primary process.

According to a preferred embodiment the conversion of iodide to iodine is effected by an electrowinning process, catalyst such as green sand or a chemical process.

In another broad form, the present invention comprises:

a conversion process for conversion of iodide and/or iodine species to iodine (I2) wherein said iodine species for conversion by said conversion process are collected from an iodine purification process, the process comprising;

a source of water for one or more water consuming applications and providing a water stream in said process;

a delivery station intermediate said source of water and a treatment station;

a source of iodine at the delivery station and means to enable release into said water stream of the iodine; wherein, said water is charged with a predetermined concentration of the iodine;

wherein release of said iodine into said water stream is maintained at a predetermined concentration within a predetermined range in a water stream fed by said water supply; wherein said predetermined concentration of iodine provides a predetermined level of purification of said water stream.

According to a preferred embodiment the conversion of iodide to iodine is effected by an electrowinning process, catalyst such as green sand or a chemical process.

BRIEF DESCRIPTION OF THE DRAWINGS

The present invention will now be described in more detail according to preferred but non limiting embodiments and with reference to the accompanying illustrations wherein.

The invention will be described according to various embodiments as applied in a treatment process using a reservoir or wash tank. It will be appreciated by persons skilled in the art that the process according to alternative embodiments is also adaptable to water reticulation networks, cooling towers, swimming pools and other water consuming appliances.

Figure 1:
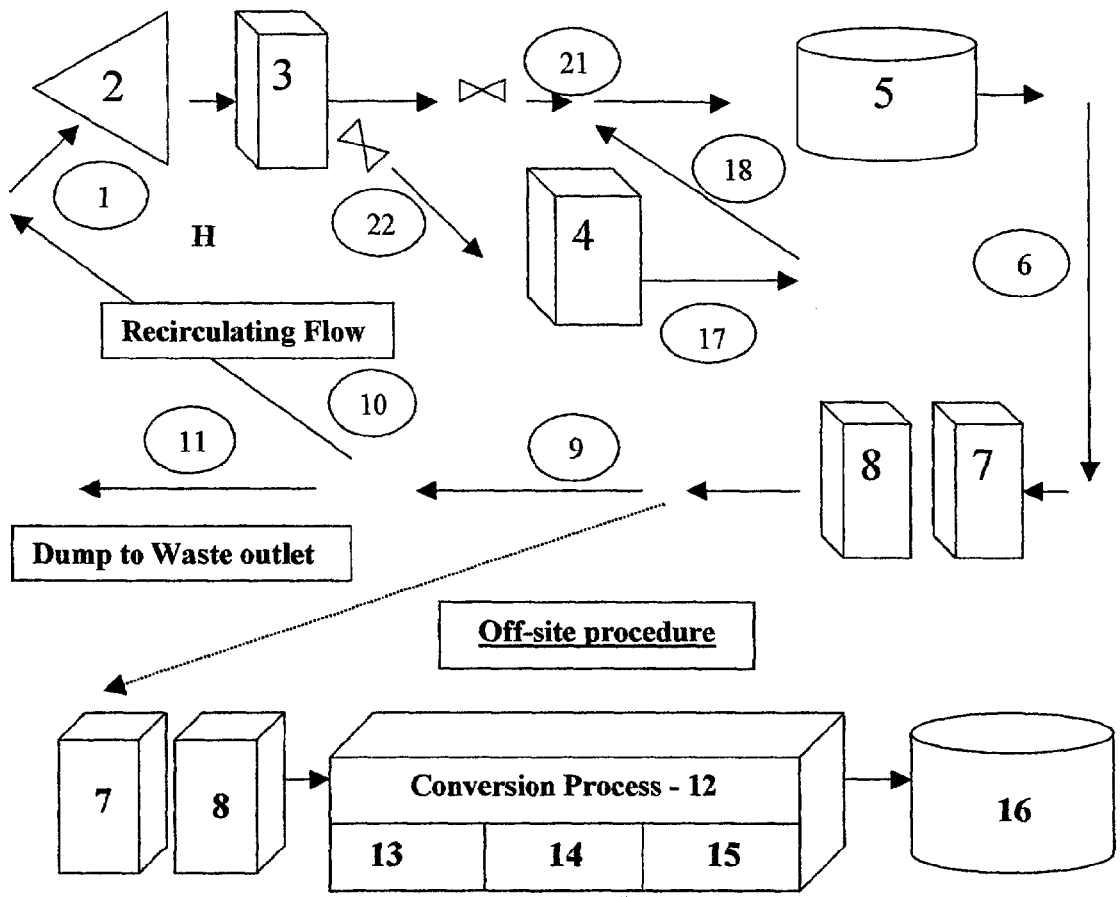
FIG. 1 shows a flow diagram of an iodine purification process according to one embodiment, wherein iodine or iodide or iodine species is collected from a water stream by an absorbing resin and iodide is converted off site by either an electrowinning process, a catalyst or other chemical conversion process for reuse in the purification process.

Referring to FIG. 1 there is shown an iodine based purification process for sanitizing consumables such as food stuffs by washing in a water stream. The process is adaptable to water reticulation systems, such as cooling towers, swimming pools and water consuming appliances. The process will principally be described with reference to its application to food sanitization in a reservoir. According to one embodiment the process comprises a source of water indicated by arrow 1 which would preferably be delivered from a mains supply or self contained supply such as a gravity feed reservoir. The process optionally comprises a circulating pump 2, and an optional filter 3 located upstream of an iodine crystals canister/s 4. One or a plurality of canisters may be used depending upon process requirements. Canisters 4 receive water via water stream 22 and discharge water via flow line 17 and 18 to main water supply flow line 21. Flow line 21 is in communication with a treatment station 5 which may be a reservoir. Canisters 4 each comprise iodine crystals and supply the water supply line 21 via lines 17 and 18 with a saturated iodine solution. An iodinated solution from iodine canister 4 is delivered via lines 17 and 18 to reservoir 5 in which biocidal treatment of consumables such as foodstuffs may take place. Water exiting reservoir 5 is directed along a flow line represented by arrow 6 where it enters iodine absorption resin canisters 7 and 8. Iodine absorption canisters 7 and 8 recover iodide from water stream 6 following which water effluent from canister 7 and 8 is either recirculated through the process via a water stream indicated by arrows 9 and 10 or discharged to waste via a water stream indicated by arrow 11.

According to the embodiment of FIG. 1, iodine absorption canisters 7 and 8 are taken off site whereupon the collected iodide or iodine species undergoes conversion at a conversion station 12. The conversion may take place using a conversion process which may be selected from an electrowinning process 13, a catalyst conversion process 14 or alternative process 15 such as use of conventional chemical reactions employing known oxidants. Iodine produced by those processes may be collected in collection tank 16 for later reuse in the sanitization process.

The catalyst process 14 is capable of converting iodide to iodine by oxidation using air at ambient temperatures. The catalyst used is preferably green sand although it will be appreciated that other suitable catalysts may be used in the conversion of iodide to iodine.

According to one embodiment, the system is adapted for recirculation such that water exiting the treatment reservoir is eventually reintroduced into the sanitization process once it has exited absorption resin canisters 7 and 8. Recirculated water may be passed through the iodine canisters 4 where the water will be enriched with iodine. Water rich in iodine will be delivered via flow line 17 and 18 to flow line 21 and to treatment reservoir 5 as previously described.

Figure 2:
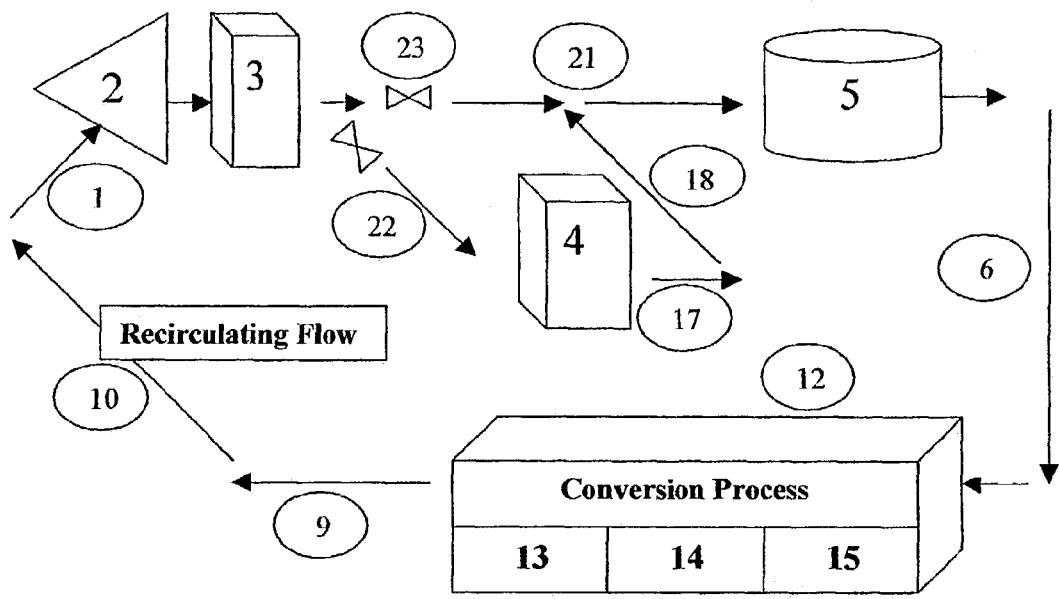
FIG. 2 shows a flow diagram of an iodine purification process according to one embodiment, wherein iodine or iodide or iodine species is converted in line by either an electrowinning process, a catalyst, chemical or other conversion process for reuse in the purification process.

Referring to FIG. 2 there is shown an alternative iodine based purification process for sanitizing consumables such as food stuffs by washing in a water stream. The process which is a variation of the process described in FIG. 1 is also adaptable to water reticulation systems, such as cooling towers, swimming pools and water consuming appliances. According to one embodiment the process comprises a source of water indicated by arrow 1 which would preferably be delivered from a mains supply or self contained supply such as a gravity feed reservoir. The process optionally comprises a circulating pump 2, and an optional filter 3 located upstream of an iodine crystals canister 4. One or a plurality of canisters may be used depending upon process requirements. Canisters 4 receive water via water stream 22 and discharge water via flow line 17 and 18 to main water supply flow line 21. Flow line 21 is in communication with a treatment station 5 which may be a reservoir. Canisters 4 each comprise iodine crystals and supply the water supply line 21 via lines 17 and 18 with a saturated iodine solution. An iodinated solution from iodine canister 4 is delivered via line 17 and 18 to engage flow line 21. As before, the canisters each comprise iodine crystals and supplies the water supply line 17 with a saturated iodine solution. Water is delivered to reservoir 5 in which biocidal treatment of consumables may take place. Water exiting reservoir 5 is directed along a path represented by arrow 6 where it enters in line conversion station 12. A conversion process may be selected from an electrowinning process 13, a catalyst conversion process 14 or alternative process 15 such as conventional chemical reactions using known oxidants. Iodine enriched water produced by those processes is reintroduced into the sanitization process via water stream indicated by arrows 9 and 10.

The catalyst process 14 is according to the FIG. 2 embodiment capable of converting iodide to iodine by oxidation using air at ambient temperatures. The catalyst used is preferably green sand although it will be appreciated that other suitable catalysts may be used in the conversion of iodide to iodine.

The process is adapted for recirculation such that water exiting the treatment reservoir 5 is eventually reintroduced into the process preferably via conversion station 12 upstream of the filter 3 which filters out any impurities. Water rich in iodine will be delivered to treatment reservoir 5 via iodine crystals canister 4 and flow line 17, 18 and 21.

Figure 3:
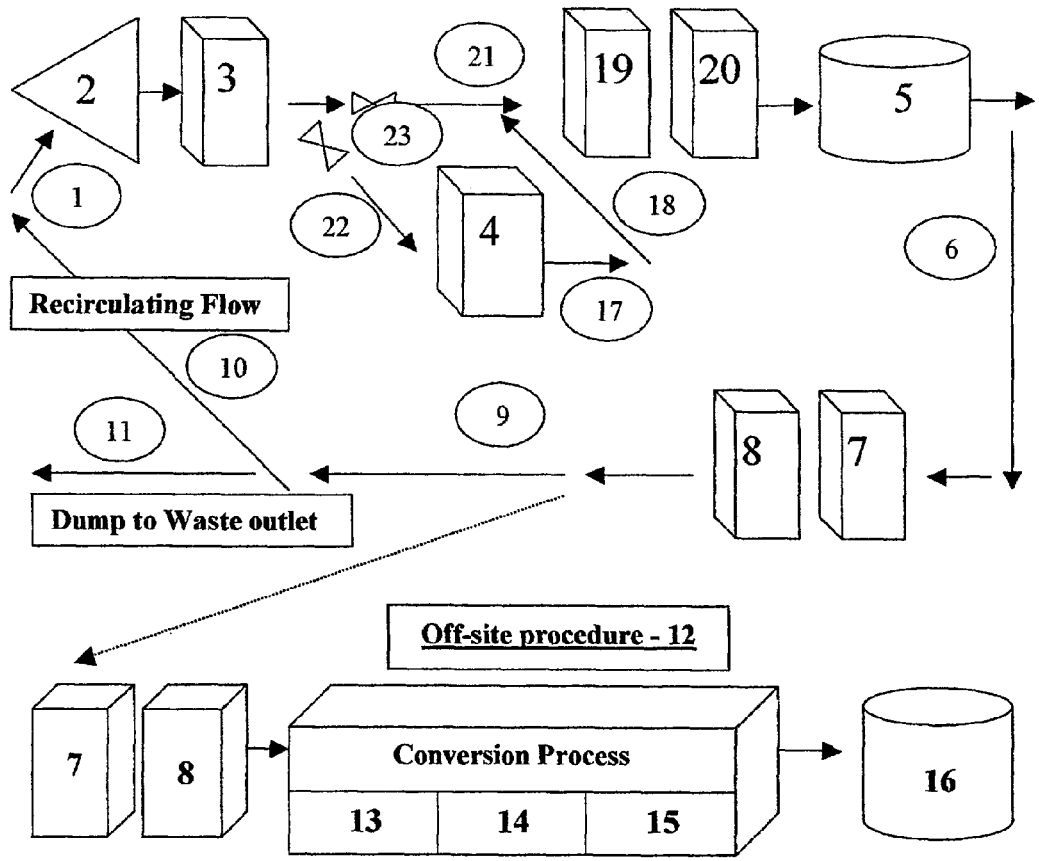
FIG. 3 shows a flow diagram of an iodine purification process according to one embodiment, wherein iodine is delivered to a treatment station via an iodine release resin and surplus iodine or iodide or iodine species is collected from a water stream by an absorbing resin and iodide is converted off site by either an electrowinning process, a catalyst or other conversion process for reuse in the purification process.

Referring to FIG. 3 there is shown an iodine based purification process substantially the same as the process described in FIG. 1, for sanitizing consumables such as food stuffs by washing in a water stream. The process comprises a source of water indicated by arrow 1 which would preferably be delivered from a mains supply or self contained supply such as a gravity feed reservoir. The process optionally comprises a circulating pump 2, and an optional filter 3 located upstream of an iodine crystals canister 4. One or a plurality of canisters may be used depending upon process requirements. Canisters 4 are in indirect communication with a treatment station 5. Canisters 4 receive water via water stream 22 and discharge water via flow line 17 and 18 to main water supply flow line 21. Flow line 21 is in communication with iodine release resins 19 and 20. Water passes through release resins 19 and 20 prior to entry into reservoir 5 thereby supplementing iodine delivered to the process from canister 4. The iodinated solution from iodine canister 4 delivered via lines 17 and 18 to reservoir 5 may be employed in biocidal treatment of consumables such as foodstuffs. Water exiting reservoir 5 is directed along a path represented by arrow 6 as before where it enters iodine absorption resin canisters 7 and 8. The remainder of the process is as described for the embodiment of FIG. 1. As with the embodiment of FIG. 1 once iodide and other iodine species are collected by collection resins 7 and 8 the water stream may be recirculated or dumped to waste depending upon process requirements.

Figure 4:
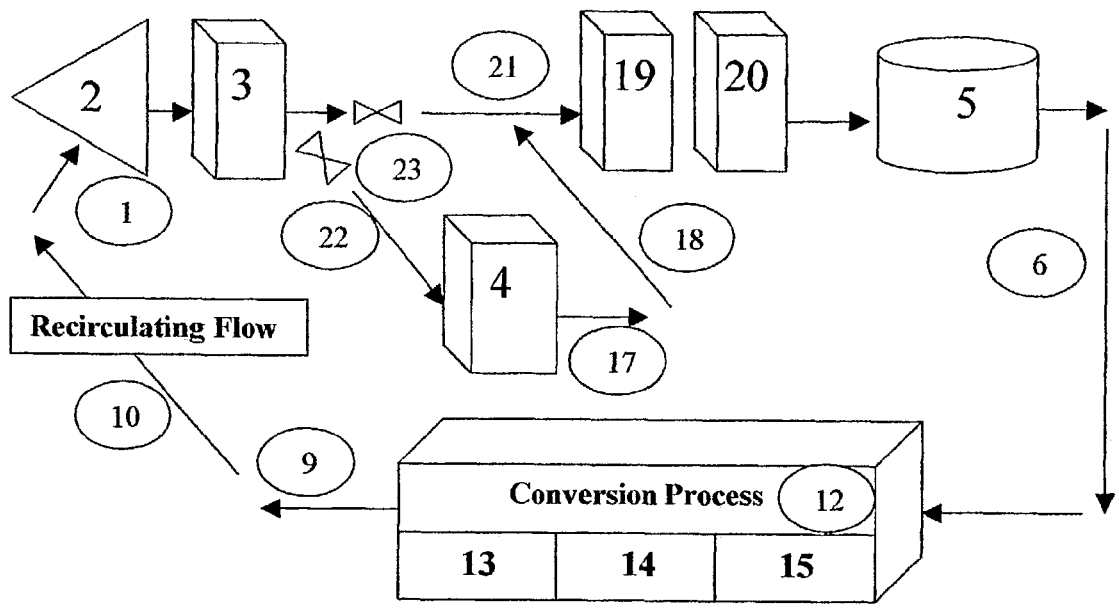
FIG. 4 shows a flow diagram of an iodine purification process according to one embodiment, wherein iodine is delivered to a treatment station via an iodine release resin and surplus iodine and/or iodide or iodine species is converted in line by either an electrowinning process, a catalyst or other conversion process for reuse in the purification process.

Referring to FIG. 4 there is shown an alternative iodine based purification process for sanitizing consumables such as foodstuffs by washing in a water stream. The process which is a variation of the process described in FIG. 2 is also adaptable to water reticulation systems, such as cooling towers, swimming pools and water consuming appliances. According to one embodiment the process comprises a source of water indicated by arrow 1 which would preferably be delivered from a mains supply or self contained supply such as a gravity feed reservoir. The process optionally comprises a circulating pump 2, and an optional filter 3 located upstream of an iodine crystals canisters 4. One or a plurality of canisters may be used depending upon process requirements. Canisters 4 are in indirect communication with a treatment reservoir 5. Canisters 4 receive water via water stream 22 and discharge water via flow lines 17 and 18 to main water supply flow line 21. Flow line 21 is in communication with iodine release resins 19 and 20. Water passes through release resins 19 and 20 prior to entry into reservoir 5 thereby supplementing iodine delivered to the process from canister 4. As before the canisters each comprise iodine crystals and supplies the water supply with a saturated iodine solution. Water exiting reservoir 5 is directed along a path represented by arrow 6 where it enters in line conversion station 12. The remainder of the process is as described for the embodiment of FIG. 2.

The catalyst process 14 is according to the FIG. 2 embodiment capable of converting iodide to iodine by oxidation using air at ambient temperatures. The catalyst used is preferably green sand although it will be appreciated that other suitable catalysts may be used in the conversion of iodide to iodine.

The process is adapted for recirculation such that water exiting the treatment reservoir 5 is eventually reintroduced into the process via conversion station 12 upstream of the filter 3 which filters out any impurities. Water rich in iodine will again be delivered to treatment reservoir 5 via iodine crystals canister 4 and release resins as previously described.

In each of the embodiments described iodine canisters 4 will receive water from the main supply system which will mix with a high surface area fast dissolving iodine specie held in the iodine canisters. There is a controlled release of iodine species by use of such means as a control valve.

According to the embodiments of the process of FIGS. 3 and 4, the iodine supply canister/s 4 may be disposed in series or parallel with resin beds 19 and 20 and water recharges the resin bed with iodine solution. In each of the embodiments of the process described, the iodine canister will preferably be activated when the resin beds require recharging and this will be measured by flow of water or by iodine residual. The flow of water exiting filter 3 may be directed along the path represented by arrow 21 where the resin beds in canisters 19 and 20 are not in need of recharging. When resin beds 19 and 20 require recharging with a predetermined proportion of water delivered in the direction of arrow 22 so that it passes through iodine canister/s 4 via lines 17 and 18 prior to entering main water flow line 21 and prior to entry into release resins 19 and 20.

In the case of the embodiments of FIGS. 3 and 4, the iodine release resin beds in canister 19 and 20 will each contain a suitable amount of anion exchange resin suitably charged with elemental iodine to a predetermined level. The anion exchange resins will release water with an iodine concentration of between 0.5 and 100 parts per million of elemental iodine into the main water flow. The iodine enriched product may be then used as a treatment in such applications as biocidal treatment of consumables such as food products introduced into reservoir 5 for sanitizing.

This is a cost effective and efficient way of ensuring that the levels of iodine are maintained at an acceptable and measurable level through the sanitizing process.

According to the embodiments of FIGS. 2 and 4, where a catalyst is selected for use at conversion station 12 the catalyst converts iodide to iodine at ambient temperatures using air as the oxidant. The iodine rich solution is then recycled back into the sanitizing process as previously described. According to one embodiment the catalyst may be green sand.

More than one resin may share the same canister. According to the embodiments of FIGS. 1 and 3 iodide absorbing resins when removed from the process for off site processing are stripped of iodide. The resin is washed of all foreign matter including chemicals, dirt and organic matter leaving an exchange resin rich in iodide. The iodide is stripped from the resin and the resin is recharged to its original condition. The iodide may be converted to iodine using an electrochemical electrolysis process, a catalyst, conventional chemical reactions or other conversion option.

In an alternative embodiment, the iodine delivery step may be initiated from a remote location. For instance a remote computer may monitor iodine, iodide or iodine species levels and adjust the delivery of iodine according to process requirements. In addition, the sanitization processes may be supplemented with iodine delivered from a remote location. In this embodiment, iodine canisters may be located remote from the process, whereupon a controlled delivery of the iodine may be effected by a PLC once process performance data and parameters which may be determined via probes, have been down loaded into the computer.

Test Results

By way of example, simulation tests were conducted to determine the efficacy of the process and methodology of the invention applied to food sanitization and more particularly to determine if use of a controlled delivery of iodine into a wash solution at predetermined concentrations would result in effective sanitization of fruits and vegetables.

The process and method of the invention described herein according to its various forms provide a capability for delivery of precisely controllable levels of iodine, which can, if appropriately used, overcome the problems caused by the use of chlorine in wash water.

This study intended to examine the efficacy of iodine as a sanitizer as applied by the controlled process of the invention described herein. The efficacy tests for iodine have been evaluated by analysing for total bacteria and fungal counts found on the surfaces of fruits and vegetables. Some of the organisms found on the surfaces of fruits and vegetables are harmful (or pathogenic) to humans and some are harmful and pathogenic to the fruits and vegetables. Reducing significantly the background levels of bacteria and fungi on fruit and vegetables will have beneficial effects on both the safety of eating the sanitised food and shelf life of the foodstuff.

Representative fruits and vegetables were chosen from each of the major categories of fruits and vegetables. While the basic efficacy data was obtained with clean water, tests were also carried out for efficacy of iodine on fruits and vegetables in presence of dirt. Dirt would normally be found in any commercial treatment situation. The time used for dipping was typically one minute, however, efficacy as a consequence of varying the time of dipping was also studied.

Materials and Methods

Post harvest dipping trials were conducted with iodine solutions, along with a chlorine solution, for washing freshly harvested fruits and vegetables to control natural organisms on the surface of the produces. The germicidal effect of iodine was examined by dipping the produce in a number of different ways as described below.

Source and Quality of Fruit and Vegetables

All the fruit and vegetables used in the experiments were obtained directly from growers. No washing or cleaning of any type was done on the produce. This meant that the bacteria and fungi were a typical representation of normal levels present when the produce comes into the packing shed for treatment and packing.

A. Tests with Laboratory Dipping

Efficacy tests of elemental iodine at a range of concentrations were performed in 5 to 10 L containers in the laboratory. With careful adjustment of levels and only a small number of samples being used for each freshly prepared dip, this method was used for oranges, potatoes, peaches, nectarines, tomatoes, lettuce and bean sprouts.

Fruits and vegetables (orange, apple, peach, nectarine and tomato) were dipped for 1 min taking 10 fruits at a time in 5–10 L of solution of set concentrations. For lettuce a total of 5 outer leaves were taken randomly from different heads and dipped in 5 L of water for 1 min. For bean sprouts, 5 perforated bags of bean sprouts each containing about 120 g of sprouts were dipped in fresh solutions.

B. Tests Performed with an Iodine Sanitizer Unit According to the Invention

These tests were performed using an iodine sanitizer unit. Dip levels of 150 L of iodine solutions were used in the treatment tank, with overall system flow rates of 30 or 60 L/min. The iodine unit was adjusted to the required concentration by adjusting the proportion of the flow going through an iodine delivery canister. Once this was done, the unit kept the iodine concentration at a constant level, with continuous recharging of iodine in the treatment tank to keep a constant concentration.

Crops tested with this unit were apples, avocadoes, potatoes, lettuce, strawberries and rockmelons.

In the iodine unit, 15 fruits/tubers of apple, potato and avocado, 30 strawberries, 6 rockmelons and 6 heads of lettuce were dipped in the (150 L) tank of iodine solutions for 1 min. For chlorine dip, 25 L solutions at 30 ppm were used for dipping the same number of fruits/tubers. The water control treatment was dipped in fresh water in the iodine unit tank with continuous circulation through pump.

C. Dipping Time

The effect of dip timing on efficacy test of iodine and chlorine was examined. Crops tested were potatoes at 30 ppm and oranges at 3.3 ppm of iodine and chlorine. In these experiments the produces were dipped for 1, 2 and 4 min for the efficacy of the chemicals. Dippings were done in a 5–10 L container at a set concentration as above.

D. Dirt Effects

Effects of dirt on efficacy of iodine and chlorine on tomato and apple using the sanitiser unit according to the invention at 30 L min.

For the test of the influence of dirt on iodine and chlorine efficacy on fruits and vegetables, an amount of dirt and organic material (clay loam soil and broccoli puree at a concentration of 0.5% of weight to dip volume) was added to dip tank in two installments 30 min apart. The water in the tank was circulated continuously through the filter of the iodine unit, which over time trapped more and more of the dirt. The produce wag dipped in the treatment tank solution in at 0 min (before dirt), 5, 20 and 50 min from the start of the experiment.

E. Residues

Residual Effect of Iodine on Orange Potato, Peach, Nectarine and Tomato.

Fruits and vegetables were dipped in 30 and 60 ppm of solution and the samples for iodine assessment were taken 3–6 hours after dipping and 3 days after dipping. The amount of iodine and iodide residues on fruits and vegetables were assessed following the 'method of analysis for determination of total iodine in foods' as recommended by National Health and Medical Research Council (June, 1986).

Total Bacteria and Total Fungal Testing

Efficiency of the chemicals was studied by observing the killing rates of naturally occurring surface organisms on fruits and vegetables. After dipping in chemicals, fruits and vegetables were allowed to air dry for a minimum of three hours before taking samples for counting the population of the organisms. The samples from the smooth or semi-smooth surface of fruits and vegetables were collected by cleaning a 9 cm² area on the surface with a wet, sterile cotton bud. The cotton bud was then placed in a vial with 10 ml of sterile water. Fruits or vegetables with rough surface like strawberry and rockmelon, the whole fruit (strawberry) or a cut portion of rockmelon skin (20 cm²) were shaken in a stomaching bag with 50–70 mls of 1% peptone solution and then taken about 10 ml of sample for counting the organisms. For each treatment a sample was taken from each of the 5 different fruits/vegetables. These samples were then used for counting the bacteria and fungal colonies after culturing dilutions on NA or PDA culture media. Samples (0.25 ml) from the dilutions were spread on NA plates in duplicate and incubated at 20–25 degrees C. for 2–3 days before counting the number of colonies. The number of bacteria and fungal colonies were then calculated per cm² of the surface area and converted to $\log_{10}$ values.

RESULTS

Besides being expressed as total count per cm², the results were converted to log10 units as is commonly used in food microbiology. The efficacy of the chemicals are also indicated by the $\log_{10}$ reduction value, with the reduction made in comparison with the undipped control treatment. This was used rather than the dipped control because the water used in the dipped control especially of the 150 L treatment tank, may contain traces of chlorine and therefore not give a true 'control' value.

The following tables provide results of chemical treatments on selected fruits and compares iodine treatment to chlorine.

Peach (Lab Dipped)

TABLE 1

| Chemical treatments | Bacterial population per cm² | | | Fungal population per cm² | | |
|---|---|---|---|---|---|---|
| | Actual count | $\log_{10}$ count | $\log_{10}$ reduction | Actual count | $\log_{10}$ count | $\log_{10}$ reduction |
| Control (undipped) | 2170 | 3.31 | 0.00 a* | 185 | 2.26 | 0.00 a* |
| Control (dipped) | 1054 | 3.01 | 0.30 ab | 128 | 2.09 | 0.16 ab |
| Iodine 3.3 ppm | 469 | 2.65 | 0.66 b | 66 | 1.81 | 0.45 ab |
| Iodine 10 ppm | 83 | 1.9 | 1.41 c | 17 | 1.00 | 1.26 c |
| Iodine 30 ppm | 8.5 | 0.41 | 2.90 e | 2.3 | 0.23 | 2.03 d |
| Chlorine 30 ppm | 79 | 0.85 | 2.46 de | 3.2 | 0.29 | 1.97 d |

*Means followed by different letters are significantly different (k LSD test)

Iodine increased in effectiveness up to 30 ppm, with a similar pattern for bacteria and fungi. Log10 reductions of greater than 2 show iodine being very effective at 30 ppm against both bacteria and fungi. Bacterial control by iodine was more effective than fungal control by iodine. There was a major increase in effectiveness going from 10 to 30 ppm. Iodine was more effective than chlorine for bacteria (with 10 ppm iodine being equal to 30 ppm chlorine) than for fungi.

Potato (Sanitizing Unit)

TABLE 2

| Chemical treatments | Bacterial population per cm² | | | Fungal population per cm² | | |
|---|---|---|---|---|---|---|
| | Actual count | $\log_{10}$ count | $\log_{10}$ reduction | Actual count | $\log_{10}$ count | $\log_{10}$ reduction |
| Control (undipped) | 906 | 2.92 | 0.00 a* | 127 | 2.03 | 0.00 a |
| Control (dipped) | 716 | 2.82 | 0.10 a | 20 | 1.28 | 0.79 b |
| Iodine 10 ppm | 370 | 2.54 | 0.39 ab | 2 | 0.07 | 1.96 d |
| Iodine 20 ppm | 260 | 2.34 | 0.58 b | 3 | 0.04 | 1.99 d |
| Iodine 30 ppm | 249 | 2.38 | 0.54 b | 3 | 0.40 | 1.63 cd |
| Chlorine 30 ppm | 378 | 2.56 | 0.38 ab | 4 | 0.62 | 1.46 c |

*Means followed by different letters are significantly different (k LSD test)

Iodine was of limited effectiveness against bacteria. The effectiveness was greater against fungi this time, with good log10 reduction between 1.5 and 2 for concentrations between 10 and 30 ppm. There was no greater control as concentration increased for 10 to 30 ppm. Fungal control by iodine was more effective than bacterial control. The increased effectiveness against fungi in this experiment is believed to be due to the more effective delivery of iodine by the Sanitising Unit according to the invention. Fungi are a more serious cause of the loss of keeping quality on potatoes under most conditions than bacteria, so iodine treatment would be effective for potatoes.

Lettuce (Sanitizing Unit)

TABLE 3

| Chemical treatments | Bacterial population per cm² | | | Fungal population per cm² | | |
|---|---|---|---|---|---|---|
| | Actual count | $\log_{10}$ count | $\log_{10}$ reduction | Actual count | $\log_{10}$ count | $\log_{10}$ reduction |
| Control (undipped) | 3077 | 3.39 | 0.00 a* | 20 | 1.32 | 0.00 a |
| Control (dipped) | 1261 | 3.06 | 0.33 a | 14 | 1.04 | 0.28 a |
| Iodine 10 ppm | 130 | 2.03 | 1.36 b | 1.03 | −0.12 | 1.44 bc |
| Iodine 20 ppm | 79 | 1.64 | 1.74 bc | 0.44 | −0.35 | 1.67 bc |
| Iodine 30 ppm | 38 | 1.51 | 1.89 c | 0.44 | −0.35 | 1.67 bc |
| Chlorine 30 ppm | 14 | 0.71 | 2.11 d | 0.44 | −0.35 | 1.67 bc |

*Means followed by different letters are significantly different (k LSD test)

Iodine increased in effectiveness up to 30 ppm, with a similar pattern for bacteria and fungi. Log10 reductions of greater than 1.5 show iodine being effective at 20 and 30 ppm against fungi. Bacterial control by iodine was more effective than fungal control. There was a major increase in effectiveness going from 10 to 30 ppm. Chlorine was more effective than iodine for bacteria. Iodine was equivalent in effectiveness to chlorine for fungi.

The Iodine Sanitizer Unit according to the embodiments of the invention described and with their constant delivery resulted in large improvements in effectiveness compared to laboratory dipping.

Apple (Iodine Sanitization Unit)

TABLE 4

|  | Bacterial population per cm² | | | Fungal population per cm² | | |
| --- | --- | --- | --- | --- | --- | --- |
| Chemical treatments | Actual count | Log₁₀ count | Log₁₀ reduction | Actual count | Log₁₀ count | Log₁₀ reduction |
| Control (undipped) | 160 | 2.14 | 0.00 a* | 104 | 1.99 | 0.00 a |
| Control (dipped) | 93 | 1.95 | 0.20 a | 60 | 1.70 | 0.29 a |
| Iodine 10 ppm | 10 | 0.20 | 1.94 b | 3.2 | −0.56 | 2.55 bc |
| Iodine 20 ppm | 6.7 | 0.086 | 2.05 b | 1.8 | −0.37 | 2.36 bc |
| Iodine 30 ppm | 1.4 | −0.40 | 2.54 bc | 0.1 | −1.00 | 2.99 c |
| Chlorine 30 ppm | 4.0 | 0.28 | 1.86 b | 1.8 | −0.13 | 2.12 b |

*Means followed by different letters are significantly different (k LSD test)

Iodine increased in effectiveness up to 30 ppm, with a similar pattern for bacteria and fungi. Log10 reductions of greater than 2 show iodine being very effective at 30 ppm against both bacteria and fungi. Fungal control by iodine was more effective than bacterial control. There was a major increase in effectiveness going from 10 to 30 ppm. Iodine was considerably more effective than chlorine for bacteria and fungi. While the effectiveness is greatest at 30 ppm, iodine is so effective against apples that 20 ppm is still very effective, especially for fungi which are a bigger problem for keeping quality.

Strawberry (Sanitization Unit)

TABLE 5

|  | Bacterial population per cm² | | | Fungal population per cm² | | |
| --- | --- | --- | --- | --- | --- | --- |
| Chemical treatments | Actual count | Log₁₀ count | Log₁₀ reduction | Actual count | Log₁₀ count | Log₁₀ reduction |
| Control (undipped) | 16405 | 4.19 | 0.00 a* | 878 | 2.93 | 0.00 a |
| Control (dipped) | 10550 | 3.96 | 0.23 ab | 864 | 2.87 | 0.057 a |
| Iodine 10 ppm | 4230 | 3.62 | 0.57 bc | 115 | 1.97 | 0.95 cd |
| Iodine 20 ppm | 3443 | 3.52 | 0.67 bcd | 71 | 1.83 | 1.10 d |
| Iodine 30 ppm | 2085 | 3.19 | 1.01 cd | 39 | 1.03 | 1.90 e |
| Chlorine 30 ppm | 3710 | 3.53 | 0.66 bcd | 519 | 2.62 | 0.31 a |

*Means followed by different letters are significantly different (k LSD test)

Iodine is of lower effectiveness for bacteria, but gives good control against fungi at higher concentrations. Log10 reductions of almost 2 for fungi shows that iodine gives very significant control at 30 ppm. Fungal control by iodine was considerably more effective than bacterial control by iodine. There was only a slight increase in effectiveness going from 10 to 30 ppm. Iodine was considerably more effective than chlorine for bacteria and fungi, with levels of 10 ppm iodine being more effective than 30 ppm chlorine.

Avocado (Sanitization Unit)

TABLE 6

|  | Bacterial population per cm² | | | Fungal population per cm² | | |
| --- | --- | --- | --- | --- | --- | --- |
| Chemical treatments | Actual count | Log₁₀ count | Log₁₀ reduction | Actual count | Log₁₀ count | Log₁₀ reduction |
| Control (undipped) | 843 | 2.92 | 0.00 a* | 121 | 2.05 | 0.00 a |
| Control (dipped) | 571 | 2.74 | 0.17 a | 72 | 1.84 | 0.21 a |
| Iodine 10 ppm | 22 | 1.27 | 1.64 d | 13 | 1.10 | 0.96 b |
| Iodine 20 ppm | 14 | 1.02 | 1.90 de | 7.6 | 0.54 | 1.51 cd |
| Iodine 30 ppm | 6.6 | 0.72 | 2.19 e | 3.1 | 0.26 | 1.79 de |
| Chlorine 30 ppm | 23 | 1.22 | 1.70 d | 9.3 | 0.94 | 1.11 bc |

*Means followed by different letters are significantly different (k LSD test)

Iodine increased in effectiveness up to 30 ppm, with a similar pattern for both bacteria and fungi. Log10 reductions of greater than 1.5 show iodine being effective at 30 ppm against both bacteria and fungi. Bacterial control and fungal control by iodine was similar. There was a major increase in effectiveness going from 10 to 30 ppm. Iodine was more effective than chlorine for bacteria (with 10 ppm iodine being equal to 30 ppm chlorine), it was similarly more effective for fungi.

Rockmelon (Sanitization Unit)

TABLE 7

|  | Bacterial population per cm² | | | Fungal population per cm² | | |
| --- | --- | --- | --- | --- | --- | --- |
| Chemical treatments | Actual count | Log₁₀ count | Log₁₀ reduction | Actual count | Log₁₀ count | Log₁₀ reduction |
| Control (undipped) | 124,380 | 5.09 | 0.00 a* | 750 | 2.86 | 0.00 a |
| Control (dipped) | 94,827 | 4.97 | 0.12 a | 493 | 2.60 | 0.25 a |
| Iodine 10 ppm | 19,514 | 4.26 | 0.83 b | 55 | 1.55 | 1.31 d |
| Iodine 20 ppm | 14,456 | 4.15 | 0.93 bc | 0.80 | −0.10 | 2.95 e |
| Iodine 30 ppm | 10,028 | 3.98 | 1.10 cd | 0.80 | −0.10 | 2.95 e |
| Chlorine 30 ppm | 10,752 | 4.03 | 1.06 bcd | 0.80 | −0.10 | 2.95 e |

*Means followed by different letters are significantly different (k LSD test)

There was only moderate activity of iodine against bacteria, however, the levels of background bacteria were extremely high. For more normal background levels of fungi, excellent control was found by iodine, with no extra benefit in efficacy found going from 20 to 30 ppm. Log10 reductions of considerably more than 2 show iodine being very effective at 20 and 30 ppm against fungi. Fungal control by iodine was more effective than bacterial control. Iodine was of equivalent effectiveness to chlorine for both bacteria and fungi.

Tomato with Dirt (Sanitization Unit)

TABLE 8

| Chemical treatments | Bacterial population per cm² | | | Fungal population per cm² | | |
|---|---|---|---|---|---|---|
| | Actual count | Log$_{10}$ count | Log$_{10}$ reduction | Actual count | Log$_{10}$ count | Log$_{10}$ reduction |
| Control | 117 | 2.08 | 0.00 a* | 36 | 1.57 | 0.00 a |
| Iodine (20 ppm) 0 min | 9 | 0.95 | 1.17 efgh | 2.7 | 0.11 | 1.46 hi |
| Iodine 5 min | 47 | 1.67 | 0.41 abc | 1.6 | −0.12 | 1.68 i |
| Iodine 20 min | 21 | 1.32 | 0.77 cde | 3.8 | 0.53 | 1.04 defg |
| Iodine 50 min | 22 | 1.33 | 0.75 cde | 3 | 0.13 | 1.45 ghi |
| Chlorine (30 ppm) 0 min | 12 | 0.98 | 1.03 defg | 3 | 0.23 | 1.34 fghi |
| Chlorine 5 min | 15 | 1.17 | 0.92 def | 4.7 | 0.62 | 0.94 def |
| Chlorine 20 min | 23 | 1.38 | 0.74 cd | 9 | 0.86 | 0.71 cd |
| Chlorine 50 min | 36 | 1.56 | 0.46 bc | 25 | 1.30 | 0.26 ab |

*Means followed by different letters are significantly different (k LSD test)

The initial level of iodine (20 ppm) and chlorine (30 ppm) used in the dip gave a reduction of bacteria and fungi by about 1 log$_{10}$ units. The addition of dirt and broccoli puree raises the level of bacteria on the surface of the tomatoes, despite the presence of sanitizers in the dip. This is because high levels of bacteria were present in the added dirt and these raised levels were transferred to the surface of the tomatoes. After 5 min of adding dirt, iodine was less active than that of chlorine against bacteria, but was more active against fungi. As iodine was recharging into the tank at its set concentration, it reactivated over time and showed increased effectiveness in controlling the organisms in the later treatments. On the contrary, chlorine was not recharging and its concentration was reducing over time after addition of dirt and reduced the effectiveness against the organisms. Over time, and as dirt levels build in the dip, iodine becomes more and more effective in comparison to chlorine.

Apple with Dirt (Sanitization Unit)

TABLE 9

| Chemical treatments | Bacterial population per cm² | | | Fungal population per cm² | | |
|---|---|---|---|---|---|---|
| | Actual count | Log$_{10}$ count | Log$_{10}$ reduction | Actual count | Log$_{10}$ count | Log$_{10}$ reduction |
| Control | 126 | 2.01 | 0.00 a* | 59 | 1.73 | 0.00 a |
| Iodine 0 min | 5 | 0.31 | 1.71 fg | 0.44 | −0.35 | 2.09 g |
| Iodine 5 min | 60 | 1.74 | 0.28 a | 0.8 | −0.21 | 1.95 g |

TABLE 9-continued

| Chemical treatments | Bacterial population per cm² | | | Fungal population per cm² | | |
|---|---|---|---|---|---|---|
| | Actual count | Log$_{10}$ count | Log$_{10}$ reduction | Actual count | Log$_{10}$ count | Log$_{10}$ reduction |
| Iodine 20 min | 6 | 0.73 | 1.29 cdcf | 4 | 0.47 | 1.27 cdef |
| Iodine 50 min | 5 | 0.48 | 1.53 defg | 5 | 0.12 | 1.62 ef |
| Chlorine 0 min | 3 | 0.25 | 1.77 fg | 3 | 0.20 | 1.53 defg |
| Chlorine 5 min | 26 | 1.03 | 0.99 bcd | 7 | 0.60 | 1.14 cde |
| Chlorine 20 min | 22 | 1.07 | 0.94 bc | 6 | 0.67 | 1.07 bcde |
| Chlorine 50 min | 56 | 1.69 | 0.33 a | 19 | 1.22 | 0.52 ab |

*Means followed by different letters are significantly different (k LSD test)

The initial level of iodine and chlorine in the dip gave a reduction of bacteria and fungi by about 1.5 log$_{10}$ units. It is noticeable that the addition of dirt and broccoli puree raises the level of bacteria on the surface of the apples. This is because high levels of bacteria were present in the added dirt and these higher levels were transferred to the surface of the apples. After 5 min of adding dirt, iodine was less active than that of chlorine against bacteria, but was found to be more active against fungi. As iodine was recharging into the tank at its set concentration (20 ppm), it reactivated over time and showed increased effectiveness in controlling the organisms in the later treatments. On the contrary, chlorine was not recharging and its concentration was reducing over time after addition of dirt and reduced the effectiveness against the organisms. Over time, and as dirt levels build in the dip, iodine becomes more and more effective in comparison to chlorine.

These results clearly show the efficacy of iodine as a sanitiser against bacteria and fungi found on fresh fruit and vegetables (see Summary Table below).

Application of iodine by the Iodine Sanitizer Unit was found to be considerably more effective than using an iodine dip. Over the range of products and concentrations used, iodine was found to be considerably more effective than an equivalent concentration of chlorine. This is particularly so if the iodine was added with the Iodine Sanitizer Unit.

With some crops, iodine controlled bacteria best and with other crops it controlled fungi best. It seems the ISU especially assists with iodine control against fungi. The required concentration to give a very good reduction in bacteria or fungi of 1.5 log$_{10}$ (or a 30 fold reduction in concentration) varied considerably from crop to crop and suggests that different concentrations should be recommended for different types of crops.

Summary Table of Efficacy Results

| Crop | Better Control of Bacteria/Fungi | Bacteria—dose for ~1.5 log$_{10}$ reduction | Fungi—dose for ~1.5 log$_{10}$ reduction | Better control by iodine/chlorine |
|---|---|---|---|---|
| Orange (L)* | Bacteria | 30 | 30 | Chlorine |
| Nectarine (L)* | Bacteria | 3.3 | 10 | Iodine |
| Peach (L)* | Bacteria | 10 | 30 | Iodine |

-continued

| Crop | Better Control of Bacteria/Fungi | Bacteria—dose for ~1.5 $\log_{10}$ reduction | Fungi—dose for ~1.5 $\log_{10}$ reduction | Better control by iodine/chlorine |
|---|---|---|---|---|
| Potato (L)* | Fungi | >30 | >30 | Iodine |
| Potato (ISU) | Fungi | >30 | 10 | Iodine |
| Tomato (L) | Fungi | 20 | 20 | Iodine |
| Lettuce (L) | Bacteria | 30 | >30 | Chlorine |
| Lettuce (ISU) | Fungi | 20 | 10 | Iodine |
| Bean sprouts (ISU) | — | 30 | 30 | Iodine |
| Apples (ISU) | Fungi | 10 | 10 | Iodine |
| Strawberry (ISU) | Fungi | >30 | 30 | Iodine |
| Avocado (ISU) | Bacteria | 10 | 20 | Iodine |
| Rockmelon (ISU) | Fungi | >30 | 20 | Same effectiveness |

*Concentrations of 3, 10 & 30 used rather than 10, 20, 30 ppm iodine.

The effect of adding high levels of dirt to both the iodine and chlorine dips in a recirculating mode demonstrated that as dirt levels and time of dip usage increased, the Iodine Sanitizer Unit was considerably superior to chlorine. The results also demonstrated that increasing the dip concentration using iodine dips from one to four minutes was equivalent in effectiveness to doubling the dip concentration.

It will be recognised by persons skilled in the art that numerous variations and modifications may be made to the invention as broadly described herein such as but not limited to use of substitutes for the resins without departing from the overall spirit and scope of the invention.

The claims defining the invention are as follows:

1. An apparatus for iodine decontamination and purification of a water stream, the apparatus comprising:
    a source of water for one or more water consuming applications and for providing a water stream;
    a delivery station intermediate said source of water and a treatment station;
    a source of iodine at the delivery station;
    means to enable release into said water stream of said iodine;
    a monitoring electrode associated with the delivery station which maintains the iodine in said water stream at a predetermined concentration to provide a predetermined level of purification of said water stream and/or objects in contact with said water stream in the treatment station;
    means for recovery from said water stream of said iodine and/or iodide and/or other iodine species derived from said iodine; and
    means for conversion of all said recovered iodine species derived from said iodine delivered to said stream to iodine as used in this system.

2. An apparatus according to claim 1, further including a controller which receives a signal from the monitoring electrode relating to the actual concentration of iodine in the water stream which compares iodine concentration in the water stream with said predetermined concentration.

3. An apparatus according to claim 2, wherein the controller is a computer which enables controlled release of iodine from said delivery station when said iodine falls below the predetermined concentration.

4. An apparatus according to claim 3, wherein the electrode is iodine specific.

5. An apparatus according to claim 3, wherein said computer prevents delivery of said iodine from the delivery station when the iodine concentration reaches the predetermined concentration.

6. An apparatus according to claims 1 or 5, further comprising an iodide/absorption collection resin which receives effluent from said treatment station and which recovers iodide from said effluent.

7. An apparatus according to claim 1, wherein said conversion means comprises electrowinning means to convert said iodine species to iodine.

8. An apparatus according to claim 1, wherein said conversion means employs green sand as a catalyst.

9. An apparatus according to claim 1, wherein said conversion means employs a chemical process using chemical oxidants.

10. An apparatus according to claim 9, wherein said chemical oxidants are selected from permanganate, dichromate, hydrogen peroxide, bromate, iodate, chlorate, cerium, copper, chlorine and bromine.

11. An apparatus for maintaining a concentration of elemental iodine within a predetermined range in a water stream used in a sanitizing process for the decontamination of consumables such as foodstuffs and of installations using water reticulation such as waste water, swimming pools, water supplies, cooling towers, water tanks, town water by flushing or washing with water having said predetermined concentration of iodine; said apparatus comprising:
    a water reticulation network including a source of water, a delivery station and a treatment station;
    a source of iodine disposed intermediate said source of water and said treatment station;
    an electrode to control release of iodine into said water stream such that the iodine is maintained at a predetermined concentration so that the concentration of iodine provides a predetermined level of purification of said water stream or objects introduced into said water stream; and
    conversion means capable of conversion of iodide to iodine thereby providing an iodine rich solution for reuse in a process in communication with effluent from said treatment station.

12. An apparatus according to claim 11, wherein the electrode sends a signal relating to the actual concentration of iodine in the water stream to a controller which compares iodine concentration in the water stream with said predetermined concentration.

13. An apparatus according to claim 12, wherein the controller is a computer which enables controlled release of iodine from said delivery station when said iodine falls below the predetermined concentration.

14. An apparatus according to claim 12, wherein said controller releases a predetermined concentration of iodine into the water stream proportionate to a level of contamination of said water stream or objects in contact with the water stream in the treatment station.

15. An apparatus according to claim 12, wherein said controller maintains the iodine concentration in the flow stream irrespective of the flow rate, temperature of the water stream and level of contamination of said water or objects in contact with the water stream in the treatment station.

16. An apparatus according to claim 11, wherein said conversion means comprises electrowinning means.

17. An apparatus according to claim 11, wherein the electrode is iodine specific.

18. An apparatus for maintaining a concentration of elemental iodine within a predetermined range in a water stream used in a process for sanitizing water or in the decontamination of consumables such as foodstuffs and in installations using water reticulation such as waste water, swimming pools, water supplies, cooling towers, water tanks or town water by flushing or washing with water having said predetermined concentration of iodine; wherein the apparatus comprises:
a water reticulation network including a source of main water supply for delivery to a treatment station;
a source of iodine disposed intermediate said source of main water supply and said treatment station;
at least one receptacle for holding elemental iodine and disposed intermediate said source of iodine and said treatment station;
an iodide/absorption collection resin in communication with effluent from said treatment station which receives said effluent from said treatment station prior to recirculation of the water stream; and
a conversion station capable of conversion of iodide to iodine thereby providing iodine for reuse in said process.

19. An apparatus for conversion of iodide and/or iodine species to iodine ($I_2$) wherein said iodine species for conversion by said conversion process are collected from an iodine purification process, the apparatus comprising;
a source of water for one or more water consuming applications and providing a water stream in said process;
a delivery station intermediate said source of water and a treatment station;
a source of iodine at the delivery station and means to enable release into said water stream of the iodine; wherein,
means to charge said water with a predetermined concentration of iodine;
a monitoring electrode associated with said delivery station;
wherein said predetermined concentration of iodine provides a predetermined level of purification of said water stream and wherein said predetermined concentration of elemental iodine in said water stream is maintained by said electrode which facilitates controlled release of iodine from said source of iodine,
means for recovery from said water stream of said iodine and/or iodide and/or other iodine species derived from said iodine; and
means for conversion of all said recovered iodine species derived from said iodine delivered to said stream to iodine.

20. An apparatus according to claim 19, wherein said conversion means comprises electrowinning means.

21. An apparatus according to claim 20, wherein said conversion means comprises chemical oxidants.

22. An apparatus according to claim 21, wherein said chemical oxidants are selected from permanganate, dichromate, hydrogen peroxide, bromate, iodate, chlorate, cerium, copper, chlorine and bromine.

23. An apparatus according to claim 19, further including at least one detection probe immersed in or adjacent the water stream and which is in communication with a computer wherein the predetermined concentration of iodine is maintained in the water stream.

24. An apparatus according to claim 19, further including sensors or detection probes immersed in the water stream wherein the predetermined concentration of iodine is maintained in the water stream.

25. A method of iodine purification of a water stream and/or objects therein; the method including the steps of;
a) providing a source of water for one or more water consuming applications and providing a water stream as part of a the purification process;
b) providing an iodine delivery station intermediate said source of water and a treatment station;
c) providing a source of iodine at the delivery station and means to enable controlled release into said water stream of said iodine;
d) charging water with a predetermined concentration of iodine;
e) maintaining the predetermined concentration of iodine using an iodine specific electrode;
f) recovering said iodine and/or iodide and or other iodine species derived from said iodine from said fluid after said purification;
g) converting the iodine and/or iodide and or other iodide species to iodine ($I_2$) for reuse in the purification process.

26. A method according to claim 25, comprising the additional step of controlling the release of said iodine into the water stream at a predetermined concentration which is proportionate to a level of contamination of said water stream.

27. A method according to claim 25, comprising the further step of maintaining the predetermined iodine concentration in the flow stream irrespective of the water flow rate, temperature of the water stream and level of contamination of said water.

28. A method according to claims 25, comprising the further step of providing the iodine in solid form as a fast dissolving high surface area iodine.

29. A method according to claim 25, including the additional step of performing the conversion as part of the process in line or remote from said process.

30. A method according to claim 25, wherein the predetermined concentration of iodine in said water stream is maintained using electrodes or sensing probes immersed in said water stream.

31. A method according to claim 30, wherein a computer receives data on said iodine concentration from said electrodes or probes and activates delivery of said iodine when the concentration falls below a predetermined minimum level.

32. A method according to claim 25, wherein said conversion is performed by an electrowinning process.

33. A method according to claim 25, wherein said conversion is performed by a chemical process using chemical oxidants.

34. A method according to claim 33, wherein said conversion is performed by the chemical process in which oxidants are selected from permanganate, dichromate, hydrogen peroxide, bromate, iodate, chlorate, cerium, copper, chlorine and bromine.

35. A method according to claim 25, wherein said conversion is performed using green sand as a catalyst.

36. An apparatus for iodine decontamination and purification of a water stream, the apparatus comprising:
   a source of water for one or more water consuming applications and providing a water stream in said process;
   a delivery station intermediate said source of water and a treatment station;
   a source of iodine at the delivery station;
   means to enable release into said water stream of said iodine;
   an iodine specific monitoring electrode associated with the delivery station which maintains the iodine in said water stream at a predetermined concentration to provide a predetermined level of purification of said water stream and/or objects in contact with said water stream in the treatment station.

37. An apparatus according to claim 36, further including a controller which receives a signal from the monitoring electrode relating to the actual concentration of iodine in the water stream which compares iodine concentration in the water stream with said predetermined concentration.

38. An apparatus according to claim 37, wherein the controller is a computer which enables controlled release of iodine from said delivery station when said iodine falls below the predetermined concentration.

39. An apparatus according to claim 38, wherein said computer prevents delivery of said iodine from the delivery station when the iodine concentration reaches the predetermined concentration.

40. An apparatus according to claim 36, further comprising an iodide/absorption collection resin which receives effluent from said treatment station and which recovers iodide from said effluent.

41. An apparatus for maintaining a concentration of elemental iodine within a predetermined range in a water stream used in a process for sanitizing water or in the decontamination of consumables such as foodstuffs and in installations using water reticulation such as waste water, swimming pools, water supplies, cooling towers, water tanks or town water by flushing or washing with water having said predetermined concentration of iodine, said apparatus comprising:
   a water reticulation network including a source of main water supply for delivery to a treatment station;
   a source of iodine disposed intermediate said source of main water supply and said treatment station;
   at least one receptacle for holding elemental iodine and disposed intermediate said source of iodine and said treatment station; and
   an iodine specific monitoring electrode associated with the delivery station which maintains the iodine in said water stream at a predetermined concentration to provide a predetermined level of purification of said water stream and/or objects in contact with said water stream in the treatment station.

42. A method of iodine purification of a water stream and/or objects therein; the method including the steps of;
   a) providing a source of water for one or more water consuming applications and providing a water stream as part of a the purification process;
   b) providing an iodine delivery station intermediate said source of water and a treatment station;
   c) providing a source of iodine at the delivery station and means to enable controlled release into said water stream of said iodine;
   d) charging water with a predetermined concentration of iodine; and
   e) maintaining the predetermined concentration of iodine using an iodine specific electrode.

43. A method according to claim 42, further comprising the step of recovering from said fluid said iodine and/or iodide and/or other iodine species derived from said iodine after said purification.

44. A method according to claim 42, providing the additional step of controlling the release of said iodine into the water stream at a predetermined concentration which is proportionate to a level of contamination of said water stream.

45. A method according to claim 44, comprising the further step of maintaining the predetermined iodine concentration in the flow stream irrespective of the water flow rate, temperature of the water stream and level of contamination of said water.

46. A method according to claim 45, wherein the predetermined concentration of iodine in said water stream is maintained using electrodes or sensing probes immersed in said water stream.

47. A method according to claim 46, wherein a computer receives data on said iodine concentration from said electrodes or probes and activates delivery of said iodine when the concentration fall below a predetermined minimum level.

48. A method according to claim 42, comprising the further step of providing the iodine in solid form as a fast dissolving high surface area iodine.

* * * * *